United States Patent [19]

Ceska et al.

[11] 4,368,077

[45] Jan. 11, 1983

[54] LATEX COMPOSITIONS AND PRODUCTS MADE THEREFROM

[75] Inventors: Gary W. Ceska, Coraopolis, Pa.; Gerald W. Burkhart, Parkersburg, W. Va.

[73] Assignee: Polysar International, S.A., Fribourg, Switzerland

[21] Appl. No.: 223,805

[22] Filed: Jan. 9, 1981

Related U.S. Application Data

[63] Continuation of Ser. No. 107,487, Dec. 26, 1979, abandoned.

[51] Int. Cl.³ .............................................. C04B 7/356
[52] U.S. Cl. .................................... 106/96; 106/271; 106/314
[58] Field of Search ............... 106/90, 96, 271, 314; 260/28.5 B, 29.6 S

[56] References Cited

U.S. PATENT DOCUMENTS

| | | | |
|---|---|---|---|
| 2,625,489 | 1/1953 | Keating | 106/96 |
| 3,766,189 | 10/1973 | Blackford | 260/28.5 B |
| 3,895,953 | 7/1975 | Mehta | 260/29.6 S |
| 4,060,425 | 11/1977 | Harada et al. | 106/96 |
| 4,062,822 | 12/1977 | Lesage | 106/90 |

*Primary Examiner*—James Poer
*Attorney, Agent, or Firm*—Hubert E. Evans

[57] ABSTRACT

A latex containing a wax additive, useful for example in cement mortar compositions for application in thin layers such as on bridge deck overlays, overpasses, ramps, elevated sections of freeways and other locations where high resistance to penetration by water or corrosive liquids is desired, may be provided by first dissolving the wax in one of the monomers to be emulsion polymerized to form said latex.

12 Claims, No Drawings

LATEX COMPOSITIONS AND PRODUCTS MADE THEREFROM

This application is a continuation of our application Ser. No. 107,487, filed Dec. 26, 1979, now abandoned.

BACKGROUND OF THE INVENTION

Latex is well known for its plasticizing, adhesive and film forming effects, either as a coating alone or as an ingredient in a coating composition. When latex is used as a component of cement and mortar compositions, it will generally provide the cured concrete with one or more improved properties such as tensile strength, compressive strength, flexural strength and water resistance, thereby resulting in a more durable, weatherproof and wear resistant surface that also may have resistance to penetration by water or corrosive liquids such as salt solutions. These latex modified cement and mortar compositions may be used for both new construction and restoration work. Paving compositions using latex modified Portland cement produce upgraded concrete pavement in so far as tensile, compressive, flexural and bond strengths are concerned. It has also been found that latex modified concrete pavement is generally more resistant than conventional concrete to penetration by water and salt solutions and generally is less susceptible to freeze-thaw effects and chemical attack even in thin strata such as 0.75 of an inch or 1 inch.

U.S. Pat. No. 2,662,064 discloses a composition containing Portland cement, fibrous and non-fibrous fillers and pigments, a rubbery styrene butadiene copolymer in latex form, and a water-soluble thickener selected from the class consisting of hydroxyethyl starch, dextrin, hydroxyethyl cellulose, and sodium carboxymethyl cellulose. This composition is designed for use as a decorative, sprayable wall surfacing material with good adhesion and abrasion resistant properties. The patent does not teach that the composition has the resistance to penetration by water or corrosive liquids desirable for example in surfaces exposed to freeze-thaw action or to the deteriorative effects of chemical substances used for ice or snow removal such as salt.

Polymer concrete type products which may be moldable are shown in U.S. Pat. No. 3,892,704 and are said to have increased strength and waterproof properties as well as a decreased tendency to develop efflorescence. In this case the polymer is formed by reaction of a water soluble ethenoid monomer, a water soluble crosslinking monomer, and a redox catalyst system in the presence of a water soluble alkali metal sulfate or carbonate. The cement product containing the polymer is found to cure more rapidly thereby producing concrete with improved properties.

Australian Pat. Specification No. 147,189 published Sept. 9, 1948, discloses a high alumina cement, an inert filler and a vinyl polymer emulsion to provide a well bonded shock resistant non-slip coating for metal, cement, wood or other subsurfaces.

U.S. Pat. No. 2,979,476 teaches bulk polymerization of styrene to obtain crystalline polystyrene containing wax. The wax must be added at between 15% and 60% conversion of the styrene monomer and the resultant product is a moldable composition employing fillers to obtain wear-resistant, sound-sensitive phonograph records.

U.S. Re. Pat. No. 28,722 discloses a cement mortar composition comprising Portland cement, mineral aggregate, a styrene-butadiene copolymer latex, water, a non-ionic surfactant, an anionic surfactant and a polyorganosiloxane fluid surfactant. The patent teaches that less water is required to obtain a workable cement mortar when the latex and surfactants are added. Improvements in such properties of the composition as flexibility, adhesion, elongation at break and volume change are also found.

U.S. Pat. No. 4,039,345 discloses an improved shrinkage compensating Portland cement concrete and mortar composition comprising an expansive Portland cement, mineral aggregate, a styrene-butadiene copolymer latex, water, a non-ionic surfactant, an anionic surfactant, a polyorganosiloxane foam depressant, and reinforcement to provide against expansion. The patent teaches improved properties for these compositions such as compressive and flexural strength, and freeze-thaw resistance. These compositions are especially suited for use in construction of crack-free structures.

U.S. Pat. No. 4,057,528 discloses a process for repairing concrete using cement mortar compositions capable of being pneumatically sprayed which provide enhanced bonding capabilities and resistance to slump. The cement mortar compositions comprise a substantially non-air entraining Portland cement, mineral aggregate, a styrene-butadiene copolymer latex, water and a polyorganosiloxane foam depressant.

None of the above prior art compositions teach the use of a latex that has the property of decreasing the penetrability of the coating or composition in which it is used to provide improved resistance to water and/or corrosive liquids.

The Federal Highway Administration has conducted research as described in Report No. FHWA-RD-77-16 entitled "Internally Sealed Concrete: Material Characterization And Heat-Treating Studies". This report shows the use of small spherical wax particles or beads mixed with the conventional components of Portland cement, the resultant concrete having a wax content of about 3% by weight. After the concrete is cured, heat is applied and the wax melts and flows into the capillaries and bleed channels of the concrete. The wax solidifies in these capillaries and interstices, creating an internally sealed concrete. However, it is believed that the time and expense required to melt the wax through the cured concrete pavement, the complex equipment required and the energy costs to melt the wax render such a procedure highly impracticable.

SUMMARY OF THE INVENTION

It has been discovered that a latex of a polymer containing a wax additive, such as a paraffin wax, made by dissolving the wax in one or more copolymerizable monomers which are then emulsion polymerized to form a latex of a, preferably rubbery, polymer containing wax, is highly advantageous in providing concrete containing same with an improved resistance to water or deteriorating liquids such as aqueous salt solutions. The latex may be incorporated with other ingredients in cement or mortar compositions used for concrete products. The incorporation of from about 1 to about 20 percent of wax by weight of the total monomer content is effective to provide a latex with sufficient wax additive for the desired resistance to water and deteriorating liquids. When such a rubbery latex containing wax is admixed with a hydraulic cement mortar, the resulting cured concrete has improved properties of tensile, compressive and flexural strength, and also has improved properties of resistance to penetration by water or corrosive liquids, especially salt solutions, as measured by a low take up of salt solution after prolonged exposure thereto. Concrete produced using this latex containing wax will provide improved pavement, especially in thin strata such as for bridge decks, overpasses, ramps, elevated sections of freeways and parking areas of multi-level parking facilities and the like, and is resistant to the deleterious effects of chemicals used for snow and ice removal, thereby providing a durable, long-lasting and economical pavement surface.

DETAILED DESCRIPTION OF THE INVENTION

The present invention relates to an improved latex composition, to methods of producing the improved latex composition and to improved concrete wherein said improved latex has been mixed, before curing, with the mortar or cement materials used to produce the improved concrete. A preferred embodiment of the invention is a latex of a rubbery polymer, especially of rubbery styrene-butadiene containing polymers.

The improved latex of the present invention comprises a latex of a polymer which contains a wax additive admixed with the particles of polymer forming the latex. The polymer of the latex is a $C_4$–$C_6$ conjugated diolefin containing polymer, preferably is a $C_4$–$C_6$ conjugated diolefin-vinyl aromatic monomer containing polymer and most preferably is a polymer of a $C_4$–$C_6$ conjugated diolefin, a vinyl aromatic monomer, and one or more ethylenically unsaturated carboxylic acids or compounds derived therefrom. Specific examples of such polymers are polymers containing butadiene or isoprene, polymers containing butadiene or isoprene and styrene or alpha methyl styrene, and polymers containing butadiene, styrene and one or more ethylenically unsaturated carboxylic acids or compounds derived therefrom. Examples of suitable carboxylic acids include acrylic acid, methacrylic acid, cinnamic acid, crotonic acid, itaconic acid, maleic acid, fumaric acid, and atropic acid. Examples of suitable compounds derived from the aforesaid acids include acrylonitrile, acrylamide, methacrylamide, N-methylolacrylamide, and the $C_1$ to $C_6$ alkyl esters of any of the aforesaid acids. For such styrene-butadiene polymers the butadiene to styrene weight ratio will generally be from about 70:30 to about 30:70. For such polymers containing butadiene, styrene and ethylenically unsaturated carboxylic acids or compounds derived therefrom, the weight of butadiene will generally be from about 30 to about 70 parts by weight, the styrene will be from about 30 to about 70 parts by weight, and the acids or compounds derived therefrom will be from about 2 to about 10 parts by weight, for a total of 100 parts by weight. Suitable such latexes will contain from about 30 to about 60, preferably from about 45 to about 55, weight percent polymer.

The manufacture of latex by free radical emulsion polymerization is well-known in the art and described in the literature. A process for preparing a latex composition comprising a latex of a polymer containing a wax additive according to the present invention comprises dissolving said wax additive in at least one of the monomers to be polymerized and then subjecting to free radical emulsion polymerization said monomer or monomers containing wax dissolved therein and other monomers to be polymerized to produce the latex of the polymer, said polymer being a rubbery $C_4$–$C_6$ conjugated diolefin containing polymer, the amount of wax additive being from about 1 to about 20 parts by weight per 100 parts by weight of polymer. The process involves the use of agitation at the desired temperature for the desired time period in the presence of surfactants or emulsifiers and other conventional additives, such as chain transfer agents, initiators, activators, etc. Upon completion of the polymerization to the desired conversion of monomers, the resultant latex is stripped of residual monomers and the pH is adjusted to the desired usually alkaline point, for example by the addition of ammonium hydroxide. Any desired stabilizers, antioxidants, deodorants, etc. may be added. Visual study of the latex indicated that there was no free wax present in the latex, suggesting that the wax had been admixed with or within the particles of polymer forming the latex.

The waxes which may be incorporated into the polymer of the improved latex of the present invention may be selected from natural waxes of vegetable or animal origin, mineral waxes, and synthetic waxes. The representative natural waxes of vegetable or animal origin include carnauba, candelilla, hydrogenated castor oil, ouricury, Japan wax, bayberry wax, esparto grass wax, retamo, sugar cane wax, jojoba bean oil wax, palm wax, beeswax, spermaceti wax, chinese insect wax, shellac wax, and lanolin wax. Of these, carnauba, candelilla, beeswax and spermaceti wax are preferred. Mineral waxes include peat wax, montan wax, ozocerite and petroleum waxes such as paraffin waxes, microcrystalline waxes and petrolatum. Of these, petroleum waxes, especially paraffin and microcrystalline waxes, are preferred. Synthetic waxes include solid esters of polyhydric alcohols, e.g. stearates of glycerine, high molecular weight ($C_{18}$–$C_{30}$) acids or alcohols, and synthetic paraffin waxes such as produced in the Fischer-Tropsch process. It is on the basis of economy that paraffin wax is preferred for the present invention.

It was determined to be most advantageous to incorporate the wax into the latex by dissolving it in a monomer prior to the start of polymerization. When styrene is used as one of the monomers, it is preferred to dissolve the wax in the styrene monomer. The amount of wax in the latex is from about 1 to about 20, preferably from about 5 to about 15, parts by weight per 100 parts by weight of polymer in the latex. Because the monomers are generally not converted 100% to polymer, the quantity of wax added to the monomer may be adjusted accordingly to achieve the desired quantity in the polymer of the latex.

The incorporation of the wax into the latex by dissolving it in one of the monomers prior to polymerization is obviously more efficient in dispersing the wax throughout the polymer of the latex than attempting to blend a wax into the latex.

The latex of the present invention may be mixed with the cement or mortars, together with the conventionally added aggregate and water in a conventional manner. In accordance with the general practice, Portland cement, conforming to the requirements for Type II non-air entraining cement of ASTM C 150, is mixed together with sand aggregate, conforming to the requirement of ASTM C 33 for concrete sand, in a normal cement mixer in their dry or semi-dry condition for about 5 minutes. After this, water and the latex of the present invention are combined and added to the mixer and mixing is continued until a smooth homogeneous mixture is obtained. An improved concrete composition is thereby provided comprising Portland cement, aggregate, water and a latex composition comprising a latex of a polymer containing a wax additive whereby said concrete composition when cured provides increased resistance to penetration by liquids such as water or corrosive salt solutions. It is believed that the presence of the wax is responsible, at least in part, for the improvement found in the cured concrete. A process for preparing an improved concrete composition is also provided which comprises mixing Portland cement, aggregate, water and a latex composition comprising a latex of a polymer containing a wax additive, and then curing said concrete composition.

The present invention may be illustrated by the following example.

EXAMPLE 1

Latex compositions A and B were made by combining and emulsion polymerizing at a temperature of about 50° C. the ingredients listed in the following Table I. All parts are by weight.

TABLE I

|  | Composition A | Composition B |
| --- | --- | --- |
| Styrene | 66 | 66 |
| Butadiene | 34 | 34 |
| N—methylolacrylamide | 4.16 | 4.16 |
| Acrylonitrile | 2.0 | 2.0 |
| Tertiary-dodecyl mercaptan | 0.40 | 0.40 |
| Paraffin Wax[1] | — | 10.0 |
| Water | 100 | 100 |
| Dialkyl ester of sodium sulfosuccinic acid | 0.50 | 0.50 |
| Dihexyl ester of sodium sulfosuccinic acid | 0.30 | 0.30 |
| Mineral colloid | 0.10 | 0.10 |
| Tetrasodium salt of ethylenediamine tetra-acetic acid | 0.10 | 0.10 |
| Ammonium persulfate | 2.0 | 2.0 |

[1]Paraffin wax was dissolved in styrene before being added to the rest of the ingredients.

Following polymerization to a conversion of about 70 percent, the latexes were stripped to remove residual monomer and the pH adjusted to a range of from about 8 to about 10. Final solids content was 46.5 percent.

Fifteen percent of latex composition A, based on the weight of dry latex solids to the cement, was added to a dry mix of cement and sand, using a cement to sand ratio of 1 to 3.25. Water was added in a sufficient quantity to make a workable mix. After thorough mixing, a 6 inch diameter 1 inch thick specimen of concrete was prepared and cured while covered with wet burlap. After curing, the specimen was immersed in salt water for seven days and the salt solution pickup was measured by determining the weight of solution picked up by the concrete. The percent of salt solution picked up was 15.7% by weight based on the weight after immersion compared to the weight before immersion.

Latex/wax composition B was similarly mixed with cement, sand and water, thoroughly mixed and an identical specimen 6 inches in diameter and 1 inch thick was poured and cured while covered with wet burlap. After being immersed for 7 days in a salt water solution, the salt solution pickup of the specimen was measured and only 4.4% of salt solution was picked up by the specimen. Thus, the specimen containing wax picked up only a little over 25% as much salt solution as the sample without wax.

In contrast with the use of wax beads mixed with the concrete and subsequently heated to melt the wax in the cured concrete, the present invention provides a much more economical and much less complex manner of providing an improved concrete pavement.

What we claim is:

1. An improved concrete composition comprising Portland cement, aggregate, water and a latex composition comprising a latex of a polymer containing a wax additive whereby said concrete composition when cured provides increased resistance to penetration by liquids.

2. A composition as claimed in claim 1 wherein said polymer is a $C_4$–$C_6$ conjugated diolefin-vinyl aromatic monomer containing polymer.

3. A composition as claimed in claim 1 wherein said polymer is a polymer of a $C_4$–$C_6$ conjugated diolefin, a vinyl aromatic monomer and one or more ethylenically unsaturated carboxylic acids or compounds derived therefrom.

4. A composition as claimed in claims 2 or 3 wherein said polymer is a butadiene-styrene containing polymer.

5. A composition as claimed in claims 2 or 3 wherein the amount of said wax additive is from about 5 to about 15 parts by weight per 100 parts by weight of polymer.

6. A composition as claimed in claims 2 or 3 wherein said wax additive is paraffin wax present in an amount of from about 5 to about 15 parts by weight per 100 parts by weight of polymer.

7. A process for preparing an improved concrete composition which comprises mixing Portland cement, aggregate, water and a latex composition comprising a latex of a polymer containing a wax additive, and then curing said concrete composition.

8. A process as claimed in claim 7 wherein said polymer is a $C_4$–$C_6$ conjugated diolefin-vinyl aromatic monomer containing polymer.

9. A process as claimed in claim 7 wherein said polymer is a polymer of a $C_4$–$C_6$ conjugated diolefin, a vinyl aromatic monomer and one or more ethylenically unsaturated carboxylic acids or compounds derived therefrom.

10. A process as claimed in claims 8 or 9 wherein said polymer is a butadiene-styrene containing polymer wherein said wax additive is dissolved in the styrene monomer before polymerization.

11. A process as claimed in claims 8 or 9 wherein said wax additive is added in an amount of from about 5 to about 15 parts by weight per 100 parts by weight of polymer.

12. A process as claimed in claims 8 or 9 wherein said wax is paraffin wax, present in an amount of from about 5 to about 15 parts by weight per 100 parts by weight of polymer.

* * * * *